US008645162B2

(12) United States Patent
Boerger et al.

(10) Patent No.: US 8,645,162 B2
(45) Date of Patent: Feb. 4, 2014

(54) METHOD AND SYSTEM FOR ESTIMATING THE FINANCIAL LIABILITY OF A PATIENT FOR A MEDICAL SERVICE

(75) Inventors: Gene Boerger, Gallatin, TN (US); Jaideep Kulkarni, Nashville, TN (US); Philip Hardin, Brentwood, TN (US); Geoff Pace, Hendersonville, TN (US)

(73) Assignee: Envoy LLC, Nashville, TN (US)

( * ) Notice: Subject to any disclaimer, the term of this patent is extended or adjusted under 35 U.S.C. 154(b) by 1375 days.

(21) Appl. No.: 11/742,277

(22) Filed: Apr. 30, 2007

(65) Prior Publication Data

US 2007/0271119 A1 Nov. 22, 2007

Related U.S. Application Data

(60) Provisional application No. 60/796,642, filed on May 1, 2006, provisional application No. 60/797,235, filed on May 3, 2006.

(51) Int. Cl.
*G06Q 50/00* (2012.01)
(52) U.S. Cl.
USPC .................. 705/3; 705/2; 705/4; 705/40
(58) Field of Classification Search
USPC .................................. 705/2–4, 40
See application file for complete search history.

(56) References Cited

U.S. PATENT DOCUMENTS

| | | | | |
|---|---|---|---|---|
| 5,018,067 A | * | 5/1991 | Mohlenbrock et al. | 600/300 |
| 6,061,657 A | * | 5/2000 | Whiting-O'Keefe | 705/2 |
| 2003/0046113 A1 | | 3/2003 | Johnson et al. | |
| 2004/0044548 A1 | | 3/2004 | Marshall et al. | |
| 2005/0108067 A1 | * | 5/2005 | Chapman et al. | 705/4 |
| 2006/0004607 A1 | | 1/2006 | Marshall et al. | |
| 2007/0005403 A1 | * | 1/2007 | Kennedy et al. | 705/4 |
| 2007/0033070 A1 | * | 2/2007 | Beck et al. | 705/2 |
| 2007/0043595 A1 | * | 2/2007 | Pederson | 705/2 |
| 2008/0021288 A1 | | 1/2008 | Bowman et al. | |
| 2008/0027753 A1 | | 1/2008 | Dean | |

OTHER PUBLICATIONS

"CareCalc Frequently Asked Questions and Answers," BlueCross BlueShield of Florida. (3 Pages).
"Introducing CareCalc$^{SM}$—An Industry First!" BlueCross BlueShield of Florida. Fall 2006. (19 Pages).
Brown, Dick. "Humana's New Real-Time Claims Adjudication Enables Faster Member Payment to Physicians and Calculates Member;s Exact Portion of Bill," Humana. Jan. 31, 2006. Retrieved from <www.humana.com/corporatecomm/newsroom/releases/PR-News . . . > on Apr. 5, 2007. (3 Pages).

(Continued)

*Primary Examiner* — Mark Holcomb
(74) *Attorney, Agent, or Firm* — Wilmer Cutler Pickering Hale and Dorr LLP (57) ABSTRACT

A computer implemented method involving a medical service for a patient includes estimating an expected payment associated with the medical service for the patient based on a set of data including payments for similar medical services provided to a population of individuals. The method also includes estimating a cost expected to be borne by the patient for incurring the medical service based on the estimated expected payment and based on a set of parameters associated with a healthcare coverage plan of the patient. The method further includes presenting financial information that communicates the cost expected to be borne by the patient for incurring the medical service.

19 Claims, 8 Drawing Sheets

(56) References Cited

OTHER PUBLICATIONS

Karkaria, Urvaksh. "Programs show patient's bill down to penny" The Florida Times-Union. Jun. 24, 2006. retrieved from <cgi.jacksonville.com/cgi-bin/printit.cgi?story=ZZNOSTORYZZ> on Apr. 5, 2007. (2 pages).
U.S. Appl. No. 11/619,012, Marshall.
U.S. Appl. No. 11/644,577, Siegrist et al.

* cited by examiner

Patient Responsibility Estimate (Out Of Network)

Estimate Date: Thu Apr 12 16:19:14 EDT 2007
Total Estimate: $128.07
Patient ID: 344305573     Patient Name: Johnny J Demo

| Procedure Code | Estimated Allowed Amount | Co-Pay Applied | Deductible Applied | Co-Insurance Applied | Patient Responsibility | Confidence Level |
|---|---|---|---|---|---|---|
| 99213 | $61.11 | $0.00 | $61.11 | $0.00 (0%) | $61.11 | Tier 1 |
| 90658 | $9.35 | $0.00 | $5.72 | $1.82 (50%) | $7.54 | Tier 1 |
| 90471 | $11.20 | $0.00 | $0.00 | $5.60 (50%) | $5.60 | Tier 1 |
| 90807 | $104.00 | $0.00 | $0.00 | $52.00 (50%) | $52.00 | Tier 1 |
| 81002 | $3.64 | $0.00 | $0.00 | $1.82 (50%) | $1.82 | Tier 1 |
| Totals | $189.30 | $0.00 | $66.83 | $61.24 | $128.07 | |

| Procedure Code | Procedure Description |
|---|---|
| 99213 | Office or other outpatient visit for the evaluation and management of an established patient, which requires at least two of these three key components: an expanded problem focused history; an expanded problem focused examination; medical decision making of low complexity. Counseling and coordination of care with other providers or agencies are provided consistent with the nature of the problem(s) and the patient's and/or family's needs. Usually, the presenting problem(s) are of low to moderate severity. Physicians typically spend 15 minutes face-to-face with the patient and/or family. |
| 90658 | Influenza virus vaccine, split virus, for use in individuals 3 years of age and above, for intramuscular use |
| 90471 | Immunization administration (includes percutaneous, intradermal, subcutaneous, or intramuscular injections); one vaccine (single or combination vaccine/toxoid) |
| 90807 | Individual psychotherapy, insight oriented, behavior modifying and/or supportive, in an office or outpatient facility, approximately 45 to 50 minutes face-to-face with the patient with medical evaluation and management services |
| 81002 | Urinalysis, by dip stick or tablet reagent for bilirubin, glucose, hemoglobin, ketones, leukocytes, nitrite, pH, protein, specific gravity, urobilinogen, any number of these constituents; non-automated, without microscopy<fd> |

Benefit Disclaimer: VERIFICATION OF BENEFITS OR ELIGIBILITY IS NOT A GUARANTEE OF PAYMENT. PAYMENT CAN ONLY BE MADE AFTER THE CLAIM HAS BEEN RECEIVED AND REVIEWED IN REGARDS TO ELIGIBILITY, BENEFITS, MEDICAL NECESSITY, AND OTHER LIMITATIONS AND/OR EXCLUSIONS.

METHOD AND SYSTEM FOR ESTIMATING THE FINANCIAL LIABILITY OF A PATIENT FOR A MEDICAL SERVICE

CROSS-REFERENCE TO RELATED APPLICATIONS

This application claims benefit under 35 U.S.C. §119(e) of the following U.S. Applications, incorporated by reference herein:

U.S. Provisional Applications No. 60/796,642, entitled "Patient Liability Estimator", filed May 1, 2006; and U.S. Provisional Applications No. 60/797,235, entitled "Patient Liability Estimator and Calculator", filed May 3, 2006.

BACKGROUND OF THE INVENTION

1. Field of Invention

This invention generally relates to calculators for determining the financial liability of a patient for a medical service received by the patient.

2. Description of Related Art

Typically, for patients who are covered by a health insurance plan or who have healthcare benefits, some portion of the cost of a medical service received by the patient is paid by the health insurance plan, while some portion is paid by the patient. The patient's portion of the cost, also known as the patient's financial liability, often varies depending on a number of factors. These factors include, for example, the type of medical service provided, the nature of the medical service provider, and various parameters of the health insurance plan. The parameters of the health insurance plan can include the price of the medical service negotiated by the insurance plan with the provider, patient co-pay amounts, patient deductibles, and patient co-insurance. These variable factors and parameters make it difficult for a medical service provider to determine at the time of service the proper amount to collect from the patient for the service provided.

For example, for a minor out-patient procedure, the doctor's office performing the procedure would typically collect the patient's co-pay at the time of the service is provided. Although the patient may owe more than the co-pay amount due to the various parameters imposed by the patient's health insurance plan, the doctor's office would not typically collect more than the co-pay at the time of service. Rather, the doctor's office would send a claim to the patient's insurance company, which typically includes billing codes and any billed amounts. The patient's insurance company would then adjudicate the claim to determine the proper amount the insurance company is obligated to pay and pay only the proper amount to the doctor's office. The doctor's office would then bill the patient for any balance remaining to be paid.

As the cost of healthcare has increased and the design of benefits plans has shifted towards increased patient out-of-pocket-payments, many medical service providers have attempted to collect a greater portion of the amount due from the patient at the time of service. However, because of the complicated nature of claims adjudication, it is often difficult or impossible for the medical service provider to estimate the proper amount to collect from the patient. For example, one factor that complicates the determination of the patient's financial liability for a given medical service is whether the patient has reached their total out-of-pocket maximum payment for the year in which the service is rendered. Because of these, and other difficulties, providers' success at collecting amounts other than co-pays from patients at the point of service has been limited. Providers incur significant costs to balance bill their patients; it is time consuming and often ineffective, resulting in significant accounts receivable write-offs.

In addition, in situations where the service provider cannot provide an accurate estimate of the patient's financial liability for a given medical procedure, the service provider is unable to tell the patient how much an elective procedure will cost the patient. Thus, the patient is unable to evaluate if he or she wishes to undertake the elective procedure. Similarly, without an accurate estimate of the patient's cost, the service provider is unable to negotiate with the patient regarding payment plan terms, which would allow the patient to make a fully informed decision about whether to proceed with the elective procedure.

BRIEF SUMMARY OF THE INVENTION

In one aspect, the invention features a computer implemented method. The method accesses a first data set including established payments that medical service providers have agreed to be paid by healthcare coverage entities for providing medical services to individuals and determines if the first data set includes a specific established payment that a medical service provider of a patient has agreed to be paid by a healthcare coverage entity of the patient for a medical service provided to the patient. If the first data set includes the specific established payment, the method returns the specific established payment for the medical service as an expected payment associated with the medical service. If the first data set does not include the specific established payment, the method accesses a second data set including historical payments made by healthcare coverage entities to medical service providers for medical services provided to a population of individuals. The method estimates the expected payment associated with the medical service for the patient based on the historical payments. The method further estimates a cost expected to be borne by the patient for incurring the medical service based on the expected payment and based on a set of parameters associated with a healthcare coverage plan of the patient. The method presents financial information that communicates the cost expected to be borne by the patient for incurring the medical service.

In another aspect, the method also determines if the second data set includes a first set of specific historical payments that the medical service provider of a patient has been paid by the healthcare coverage entity of the patient for medical services provided to the population of individuals that are similar to the medical service for the patient. If the second data set includes the first set of specific historical payments, the method estimates the expected payment associated with the medical service for the patient based on the first set of specific historical payments. If the second data set does not include the first set of specific historical payments, the method determines if the second data set includes a second set of specific historical payments that medical service providers sharing a similar classification as the medical service provider of a patient have been paid by the healthcare coverage entity of the patient for medical services provided to the population of individuals that are similar to the medical service for the patient. If the second data set includes the second set of specific historical payments, the method estimates the expected payment associated with the medical service for the patient based on the second set of specific historical payments.

In a further aspect, at least one of the first set of specific historical payments, the second set of historical payments, and the second data set includes a sufficient quantity of historical payments to enable a reliable estimate of the expected payment associated with the medical service to be made.

In one aspect, the invention features a computer implemented method involving a medical service for a patient. The method estimates an expected payment associated with the medical service for the patient based on a set of data including payments for similar medical services provided to a population of individuals. The method estimates a cost expected to be borne by the patient for incurring the medical service based on the estimated expected payment and based on a set of parameters associated with a healthcare coverage plan of the patient. The method also presents financial information that communicates the cost expected to be borne by the patient for incurring the medical service.

In another aspect of the invention, the set of data includes a sufficient quantity of payments to enable a reliable estimate of the expected payment associated with the medical service to be made.

In a further aspect of the invention, the population of individuals and the patient have a same healthcare coverage entity at the time each was provided the medical service. The medical service for the population of individuals and the patient can be provided by a same medical service provider.

In yet another aspect of the invention, the medical service for the population of individuals and the patient is provided by medical service providers that share a similar classification.

In an aspect of the invention, estimating the expected payment occurs after determining that an established expected payment associated with the medical service is not available.

In yet a further aspect of the invention, the set of data including payments for similar medical services provided to the population of individuals is based on adjudicated medical claims.

In another aspect, the invention features a system including a computer system and program code on a computer readable medium. The program code, which when executed on the computer system, is capable of performing the functions described above.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which:

FIG. 6 is an illustrative output screen of a patient financial liability estimator system.

DETAILED DESCRIPTION OF THE INVENTION

Figure 1:
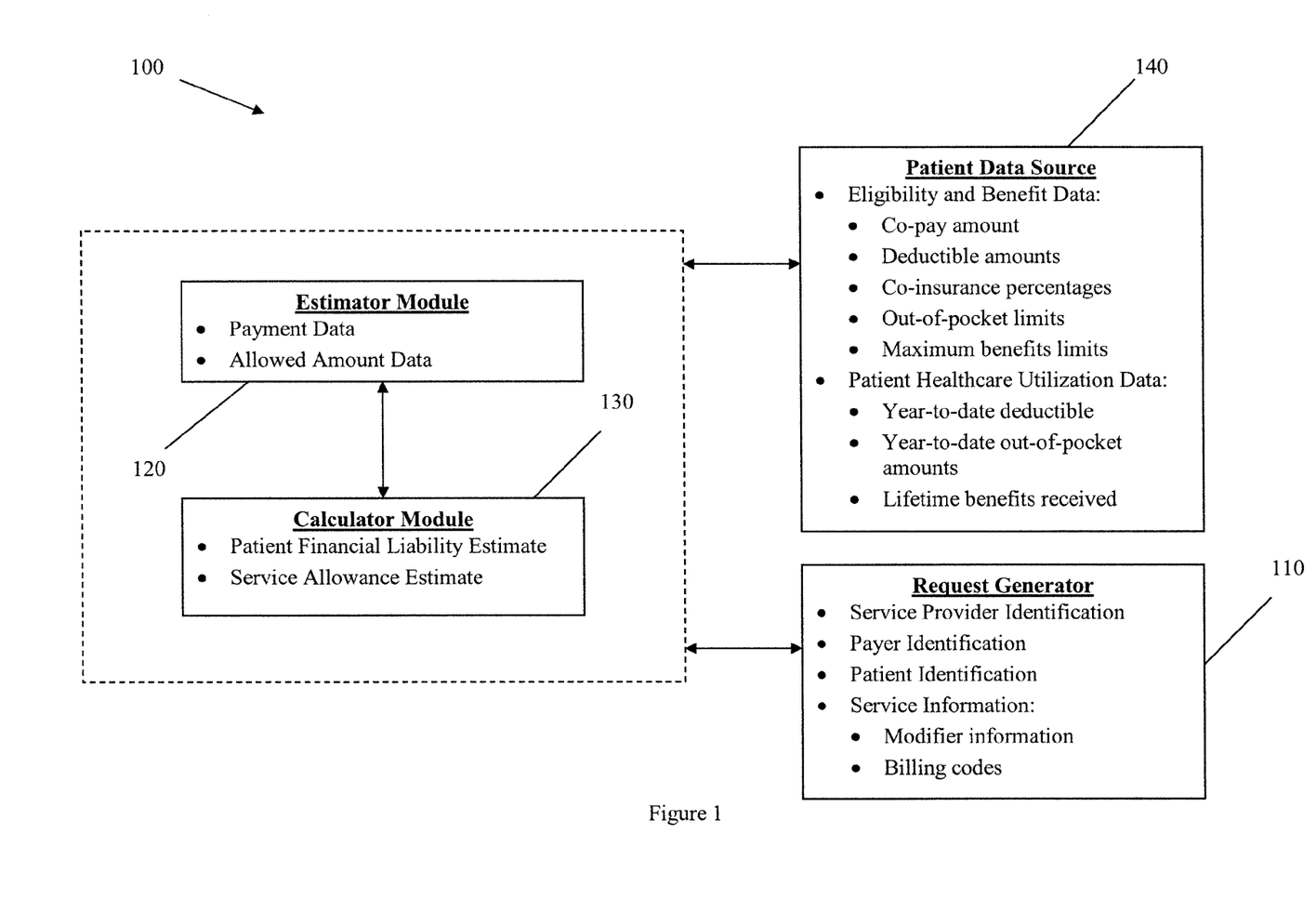
FIG. 1 is an overview of components of a patient financial liability estimator system illustrating information contributed by each component.

FIG. 1 is an overview of components of a patient financial liability estimator system 100, which illustrates information contributed by each component. System 100 helps to determine what a patient's out-of-pocket cost is likely to be for receiving a medical service given the patient's particular healthcare coverage plan and/or benefits. In general, system 100 estimates an expected payment related to the particular medical service provided to the patient by a medical service provider without regard to specific details of the patient's healthcare coverage plan. System 100 then combines this non-specific expected payment information with patient-specific healthcare coverage parameters and information to generate information that communicates the patient's likely financial liability for receiving the medical service.

A request generator 110 initiates a request for a patient's financial liability. In general, any individual or entity that wishes to estimate the patient's likely financial liability for a given medical service can create a request through request generator 110. For example, request generator 110 can be an interface accessed by the patient, a doctor's office, a hospital, and/or a healthcare coverage provider or plan administrator. Request generator 110 supplies information about the particular service provider, the specific medical service provided or to be provided (including modifier information and/or billing codes), identification of the payer, and identification of the patient. As used herein, "payer" generally refers to the entity that pays for portions of the patient's healthcare costs that are covered by the patient's healthcare plan. For example, payers can include a commercial insurer, a government insurer, a third party administrator, an employer, an employer group, a pharmaceutical benefits manager, and a health maintenance organization.

System 100 also includes an estimator module 120 that estimates the total payment expected to be made to the medical service provider for the specified medical service provided to the patient. Estimator module 120 generates this estimate without regard to the patient's specific healthcare plan and/or benefits and provides this estimate to a calculator module 130. In the implementation described herein, the expected payment is known as the "allowed amount" and represents the amount the medical service provider is expected to be paid for the medical service. As will be described in greater detail below, estimator module 120 uses a collection of known and/or historical payment data to determine the best estimate of the allowed amount associated with the medical service provided to the patient. Calculator module 130 uses the estimated allowed amount from estimator module 120 and information about the specific patient's healthcare coverage to determine the patient's likely financial liability for payment. Calculator module 130 queries a patient eligibility and benefits data source 140 for patient-specific healthcare coverage information. As elaborated below, this patient-specific information includes the patient's eligibility and benefit plan parameters as well as measures of the patient's utilization of their healthcare coverage.

Figure 2:
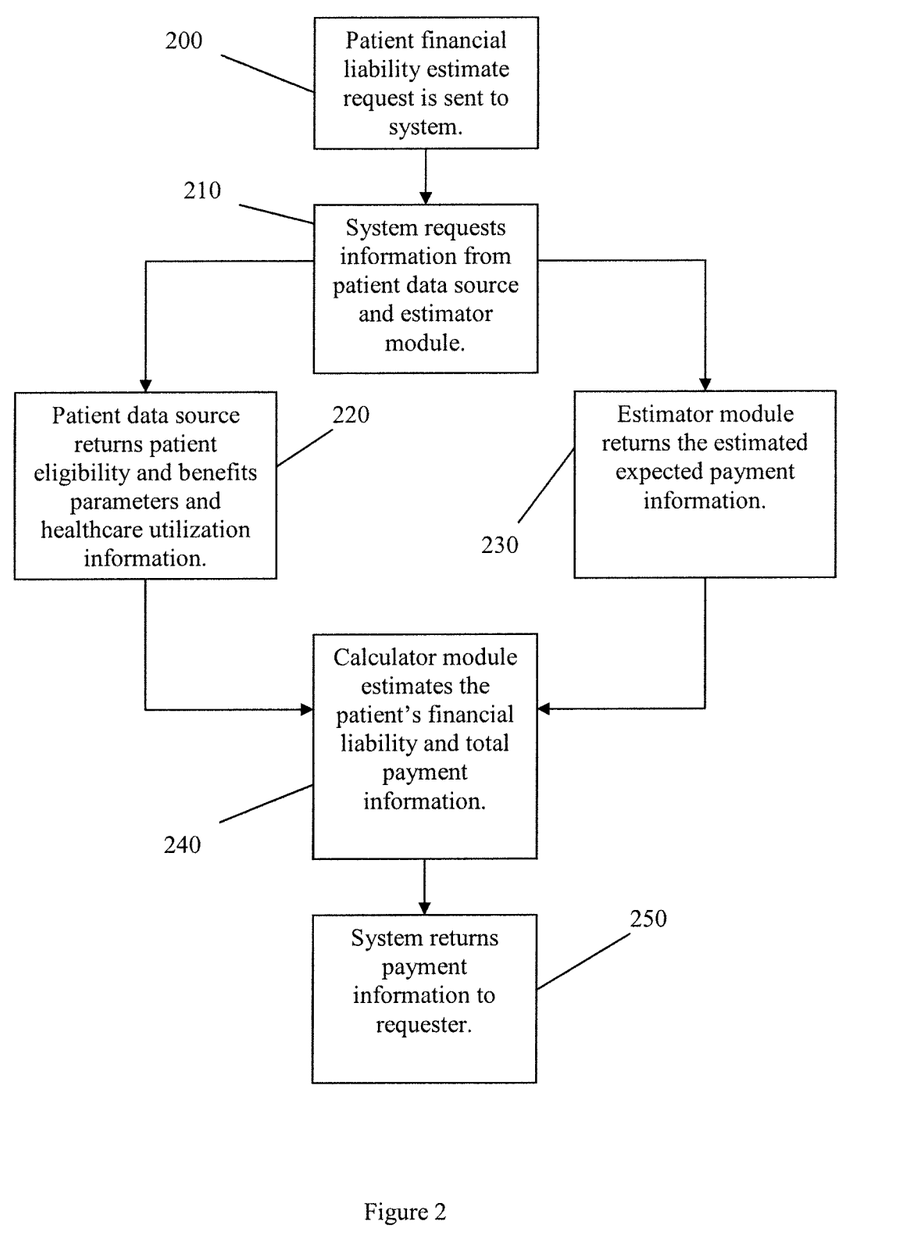
FIG. 2 is a flowchart illustrating the flow of information in a patient financial liability estimator system.

FIG. 2 is a flowchart illustrating the flow of information in patient financial liability estimator system 100 (of FIG. 1). A request for an estimate of the patient's financial liability is sent to system 100 (step 200). As summarized above, this request comes from request generator 110 (of FIG. 1) and includes information about the patient, the medical service provider, the medical service, and the payer. Using this information, system 100 solicits patient-specific information from the patient data source and generates a request for estimated payment information from the estimator module (step 210). The patient data source responds with the patient's healthcare coverage eligibility and benefit plan parameters as well as information associated with the patient's utilization of their healthcare coverage; this will be described in greater detail below (step 220). In addition, the estimator module returns estimated expected payment information for the medical service given the information provided by the request (step 230).

The calculator module combines the estimated expected payment information (which is non-patient-specific) and the patient benefits parameters and utilization information (which is patient-specific) in order to generate estimates of the total payment due the service provider and the patient's financial liability for the specific patient/medical service/service provider/payer grouping (step 240). System 100 then communicates this information to the requester, for example, via a request generator interface (step 250).

Figure 3:
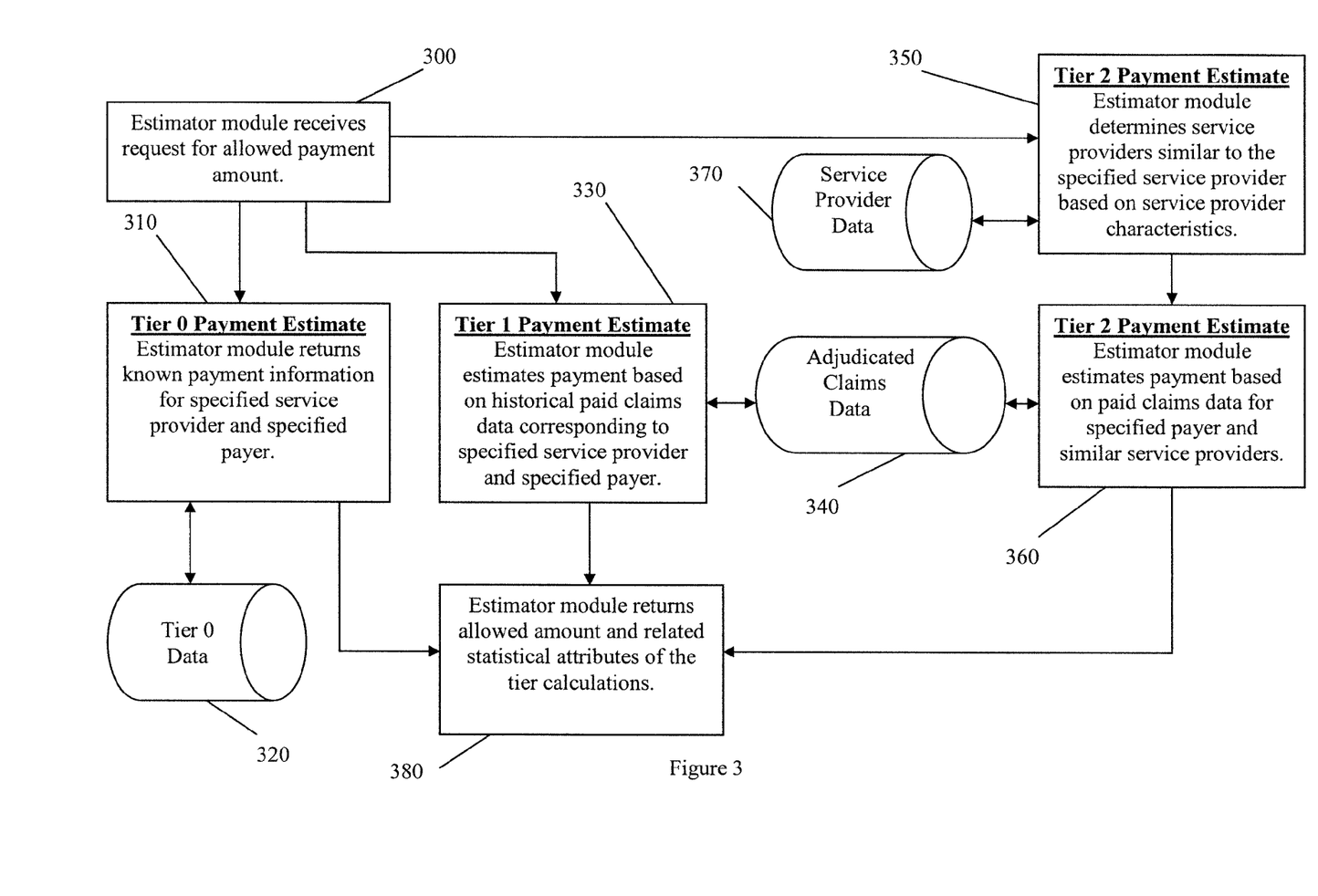
FIG. 3 is a flowchart illustrating the flow of information in an estimator module of a patient financial liability estimator system.

FIG. 3 is a flowchart illustrating the flow of information in estimator module 120 of system 100 (of FIG. 1). As described above, system 100 requests allowed payment amount information from estimator module 120 and provides information from request generator 110, such as a patient identification, a service provider identification, payer identification, and medical service and modifier information (step 300). An individual or entity seeking the estimate information supplies this information to request generator 110 (of FIG. 1). For example, a medical service provider may wish to obtain an accurate estimate of the patient's portion of the costs associated with the medical service in order to receive the most accurate patient payment at the time the service is provided. Alternatively, the patient may wish to obtain an estimate of his or her portion of the cost in advance of the actual visit to the medical service provider. Using the information from request generator 110, estimator module 120 will attempt to return the most accurate allowed amount based on known or historical payment data. The payment data is described in terms of "tiers". The various tiers of payment data vary in their levels of accuracy. The specific details of each tier of data is described below, but, in general, "tier 0" data is based on known allowed amount and is the most accurate data; "tier 1" data is based on historical payment information and is less accurate than tier 0, and "tier 2" data is also based on historical payment information and is less accurate that tier 1 data. Estimator module 120 will, in general, use the most accurate tier data available that is considered reliable.

Thus, estimator module 120 will first attempt to return a tier 0 allowed amount (step 310). Tier 0 data includes known payments for specified medical services provided by a specific medical service provider to a patient having a specified payer (e.g., a given healthcare insurance provider). Tier 0 data can include rates for specific services that have been negotiated by the specific service provider and the specific payer. Therefore, tier 0 data is very accurate data and provides the known payment for the service. Tier 0 data can be derived from specific contracts or pricing arrangements between the medical service providers and payers. In addition, the medical service providers and/or the payers can supply tier 0 data.

Estimator module 120 obtains information corresponding to the specified medical service provider, payer, and medical service information from a tier 0 data set 320. In some implementations, the medical service information is communicated to estimator module 120 according to standardized codes that identify particular medical services. This medical service information can also include the procedure type and any modifiers relevant to the procedure. If corresponding payment information for the service provider/payer/service grouping exists in tier 0 data set 320, estimator module 120 returns that information along with an indication that tier 0 data was used to generate the estimate. The payment information at least includes the allowed amount for the medical service, i.e., the payment that the medical service provider has agreed to be paid for providing the medical service without regard to what portion of the cost is paid by the payer and what portion of the cost is paid by the patient.

If tier 0 data is not available for the particular service provider/payer/service grouping, estimator module 120 attempts to return a tier 1 estimated allowed amount (step 330). Tier 1 data is based on historical payment information derived from adjudicated claims data for a collection of medical services as paid to specified service providers by specified payers. This data can be obtained from payers. Although tier 1 data is not as accurate as tier 0 data because it is based on historical data rather than known payments or rates for particular services, if a statistically significant collection of tier 1 data exists for a given service provider/payer/service grouping, estimator module 120 can provide a reasonably accurate estimate of the expected payment for the service.

Estimator module 120 uses data based on a statistical analysis of an adjudicated claims data set 340 for payment information corresponding to the specified medical service provider, payer, and medical service information as provided by system 100 in the request. Thus, the tier 1 data contains payment information for the same service provider, the same payer, and the same medical service as those of the patient. Although tier 1 data is described and illustrated as residing separate from tier 0 data, it is understood that the tiered data can be returned dynamically based on a combined data set. As described above in connection with tier 0 data, the medical service information can be communicated to estimator module 120 according to standardized codes that identify particular medical services, procedure types and/or procedure modifiers. If adjudicated claims data set 340 contains a statistically significant set of tier 1 data for the service provider/payer/service grouping, estimator module 120 generates payment information on the basis of the relevant tier 1 data. A statistically significant set of data is one which contains enough samples so as to provide a basis for a reliable estimate of the value of interest. Estimator module 120 returns the best estimate of the allowed amount using known statistical methods. For example, the best estimate can be the mode of values of the matching data set after outlier values have been removed using common statistical techniques. In addition, other related statistical attributes, such as the highest and lowest payment, standard deviation, and confidence intervals can be utilized and/or presented. As above, estimator module 120 indicates the source of the estimated payment information.

If a statistically significant set of data is not available for the particular service provider/payer/service grouping, estimator module 120 attempts to return a tier 2 estimated payment amount (steps 350 and 360). Like tier 1 data, tier 2 data is based on historical payment information derived from adjudicated claims data for a collection of medical services as paid to certain medical service providers by certain payers. However, whereas the tier 1 data is for the same service provider as that of the patient, the tier 2 data is associated with service providers having a similar classification as that of the service provider specific in the request.

Estimator module 120 determines which medical service providers have a similar classification as the service provider specified in the request based on a comparison of characteristics of the service providers (step 350). The characteristics can include, for example, one or more of the service provider's geographic location, specialty, and type of facility (e.g., doctor's office, urgent care center, hospital, etc.). The service provider characteristic information is stored in a service provider data set 370. This information is obtained from the medical service providers or from publicly available records. Service provider data set 370 is shown as a separate data source in FIG. 3. However, in some implementations, adjudicated claims data set 340 contains the service provider characteristic information associated with the payment information. In such an implementation, the system queries adjudicated claims data set 340 in place of service provider data set 370.

Estimator module 120 analyzes adjudicated claims data set 340 for payment information corresponding to the specified payer and medical service information as provided by system 100 in the request and further corresponding to the medical service providers determined to share a similar classification as the patient's service provider specified by system 100 in the request (step 360). The medical service information can be communicated to estimator module 120 according to standardized codes that identify particular medical services, procedure types and/or procedure modifiers. If adjudicated claims data set 340 contains a statistically significant set of tier 2 data for the service provider/payer/service grouping, estimator module 120 generates payment information on the basis of the relevant tier 2 data using the techniques described above in connection with tier 1 data. As above, estimator module 120 indicates the source of the payment estimate.

Although not illustrated in FIG. 3, additional tiers of data can be created from adjudicated claims data set 340. For example, the estimates above require payment information associated with the specified payer and the specified medical service. However, payment data for payers similar to the specified payer and/or data for medical services similar to the specified medical service can be used if tier 0, 1, or 2 data is not available. A comparison of payers and/or medical services, similar to the one described for medical service providers, can be performed to identify such alternate data.

As mentioned above, the components of system 100 use standardized codes to identify the specific medical services provided to the patient. Medical service providers typically use various code sets to communicate what medical services have been provided to the patient. Thus, system 100 can use any of the common code sets available in the healthcare industry, or it can use a proprietary code set. One example of a code set that can be used by system 100 is the Current Procedural Terminology (CPT®) coding system published by the American Medical Association. In general, this coding system is used to describe what treatment or services are provided to individuals by their doctors.

System 100 can also use a revenue coding system, such as that published by the National Uniform Billing Committee. This coding system is used for institutional medical billing to name a specific room, medical service, billing sum, or other information associated with treatment of an individual. Useful coding systems also include Diagnosis-Related Groups (DRGs), which is a hospital classification and reimbursement system that groups patients by diagnosis, surgical procedures, age, gender, and presence of complications. This type of system is often used to reimburse hospitals and certain types of service providers. A DRG code set can determine the payment between a service provider and a healthcare benefits payer based upon a contract between the entities. Other factors, such as geographic location of the service provider, the medical service provider's specialty, and the size of the medical service provider's practice can influence the costs of and payments for medical service.

Although medical services provided to the patient are described herein in terms of being standalone services, system 100 also takes into account medical service arrangements that bundle services. For example, a hospital may have a contract with a healthcare benefits payer to pay a fixed amount for each day of a patient's inpatient stay, regardless of what actual medical services are billed to the payer. In such a case, all relevant billing and/or procedure codes are sent to system 100 in the request for the patient's financial liability estimate. However, estimator module 120 takes the bundled service arrangement into account when determining the allowed amounts and other payment information by returning an estimate based on the fixed payment amounts rather than individual payment amounts for each service included in the bundle of services.

Estimator module 120 returns the allowed amount from the best available tier data and source of the payment information (i.e., tier 0, tier 1, or tier 2) to system 100 (step 380). The module may optionally return the related statistical attributes, as described above, and/or other measure of the anticipated accuracy of the data. If none of the tier calculations have access to the data required by the particular calculation, estimator module 120 informs system 100 that it is unable to provide expected payment information. If estimator module 120 does return the payment estimate and associated data, system 100 passes this information to calculator module 130.

Figure 4:
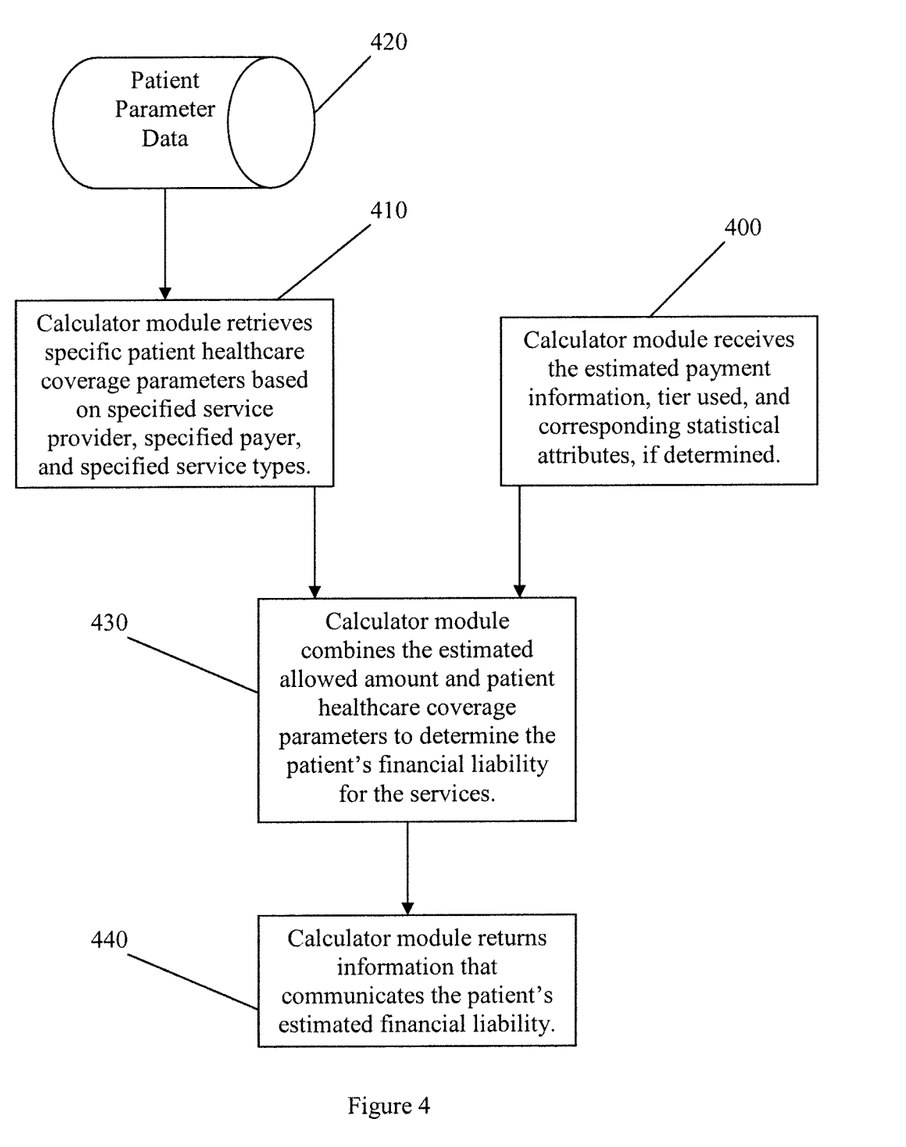
FIG. 4 is a flowchart illustrating the flow of information in a calculator module of a patient financial liability estimator system.

FIG. 4 is a flowchart illustrating the flow of information in calculator module 130 of patient financial liability estimator system 100 (see FIG. 1). Calculator module 130 receives the estimated payment information, tier estimated used, and corresponding statistical attributes, if determined, from estimator module 120 (step 400). As introduced in connection with FIG. 1, this module also retrieves healthcare coverage parameters for the patient from patient eligibility and benefits data source 140 (step 410) for the payer specified by request generator 110. Patient eligibility and benefits data source 140 stores the patient's healthcare coverage parameters in a patient parameter data set 420. These parameters govern what portion of a given medical expense is the patient's responsibility and what portion is to be paid by the payer.

Depending upon the patient's healthcare coverage plan and parameters, the portion of a given payment associated with a medical service that is the patient's responsibility varies. The parameters that govern this determination include a patient's co-pay amount, individual and/or family annual deductible amount, co-insurance percentage, lifetime benefits maximum limit, and patient out-of-pocket maximum. Although each healthcare coverage plan can vary, the following description of these parameters provides an example of how each parameter typically affects the amount the patient will pay.

The co-pay amount is typically a fixed amount that the patient must always pay upon receiving a given medical service. The co-pay amount can vary according to the type of service provided to the patient or according to the type of service provider, but the co-pay is typically the same for all services of the same type or for all service providers of the same type. For example, the patient may pay a $25 co-pay for visiting any general practice physician, but would pay a $35 co-pay for treatment by any specialist. The annual deductible is an amount of total annual out-of-pocket expense the patient must pay in a given year before the patient's healthcare benefits payer begins to pay for a portion of the medical expense. Until the annual deductible is met, the patient bears all responsibility for payments associated with a particular medical service.

After the patient has met his or her annual deductible amount, the patient whose benefits include co-insurance, pays only a percentage of the allowed amount for each medical service he or she receives, while the patient's healthcare benefits payer pays the balance. The applicability and amount of co-insurance the patient pays can vary according to the type of service provided and/or the type of service provider. For example, the patient may not be subject to co-insurance for a visit to his or her "family doctor". However, the patient may owe, for example, 30% of all payments due a hospital associated with a hospital stay, after the deductible has been satisfied. The patient can also be subject to a lifetime maximum benefit limit. Once the patient's healthcare benefits payer has paid up to this limit, the payer stops paying for any portion of the medical service provided to the patient. In this case, the entire amount for any further medical services becomes the patient's responsibility.

As explained above, the patient's payer maintains the values of these parameters. The payer can provide these values to system 100, which further enables calculator module 130 to provide a real-time eligibility response in some implementations. In addition to storing the relatively static information, such as the co-pay amounts and co-insurance percentages, the payer tracks the total payment amounts that accumulate over time. For example, the payer has an accumulator that tracks the current value of the amount of out-of-pocket costs the patient has paid. Calculator module 130 retrieves these parameters from the patient eligibility and benefits data source and combines the information with the estimated payment information received from the estimator module 120 to determine the patient's financial liability for the medical service (step 430). A detailed example of how calculator module 130 combines the allowed amount and healthcare parameter information is provided below. After calculator module 130 determines the patient's financial liability, it communicates the information to system 100 for presentation to the end user (step 440).

Figure 5A:
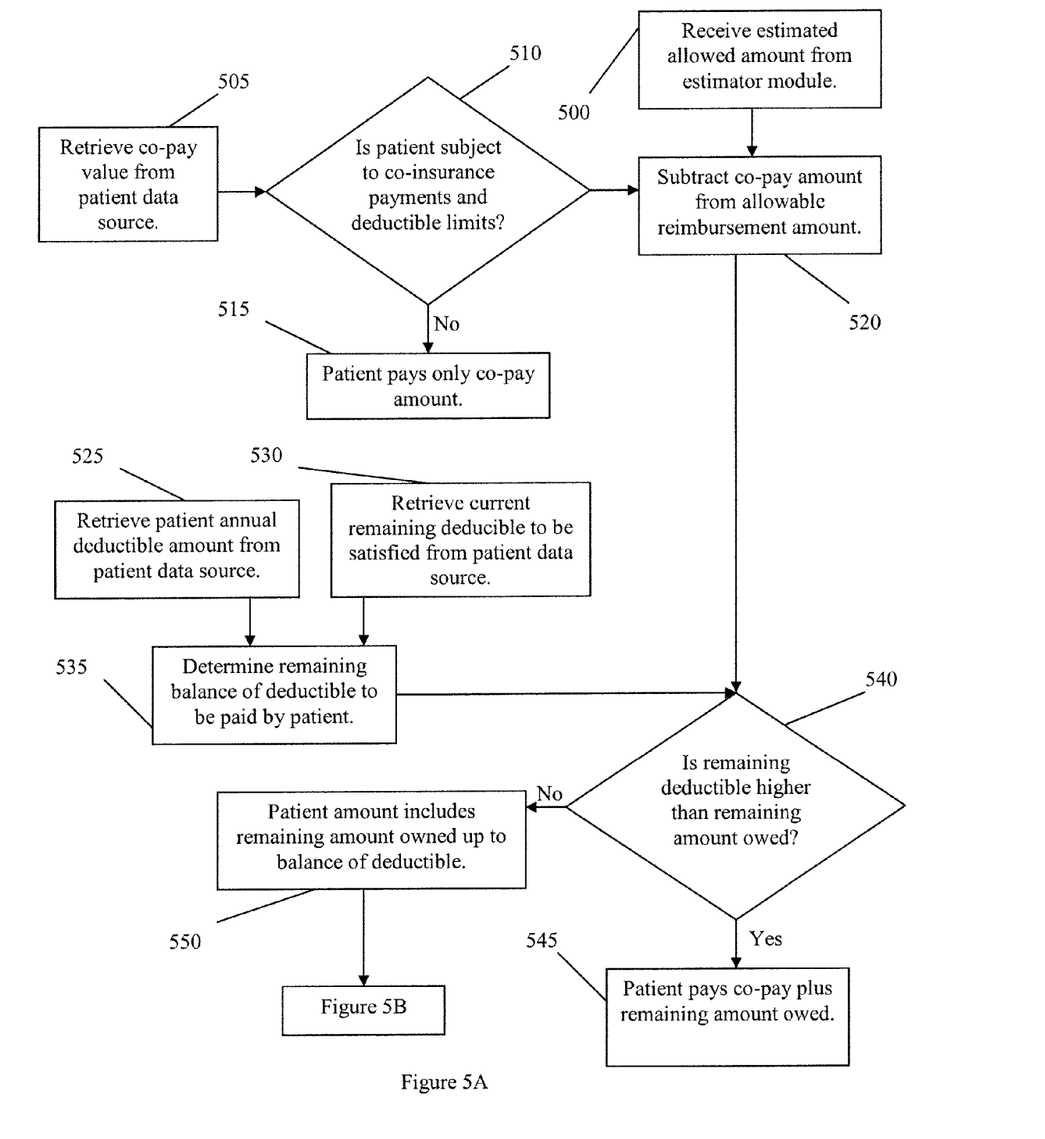
FIGS. 5A and 5B show a flowchart illustrating the application of a patient's healthcare benefits parameters to estimated cost information for a medical service to determine a patient's financial liability.
Figure 5B:
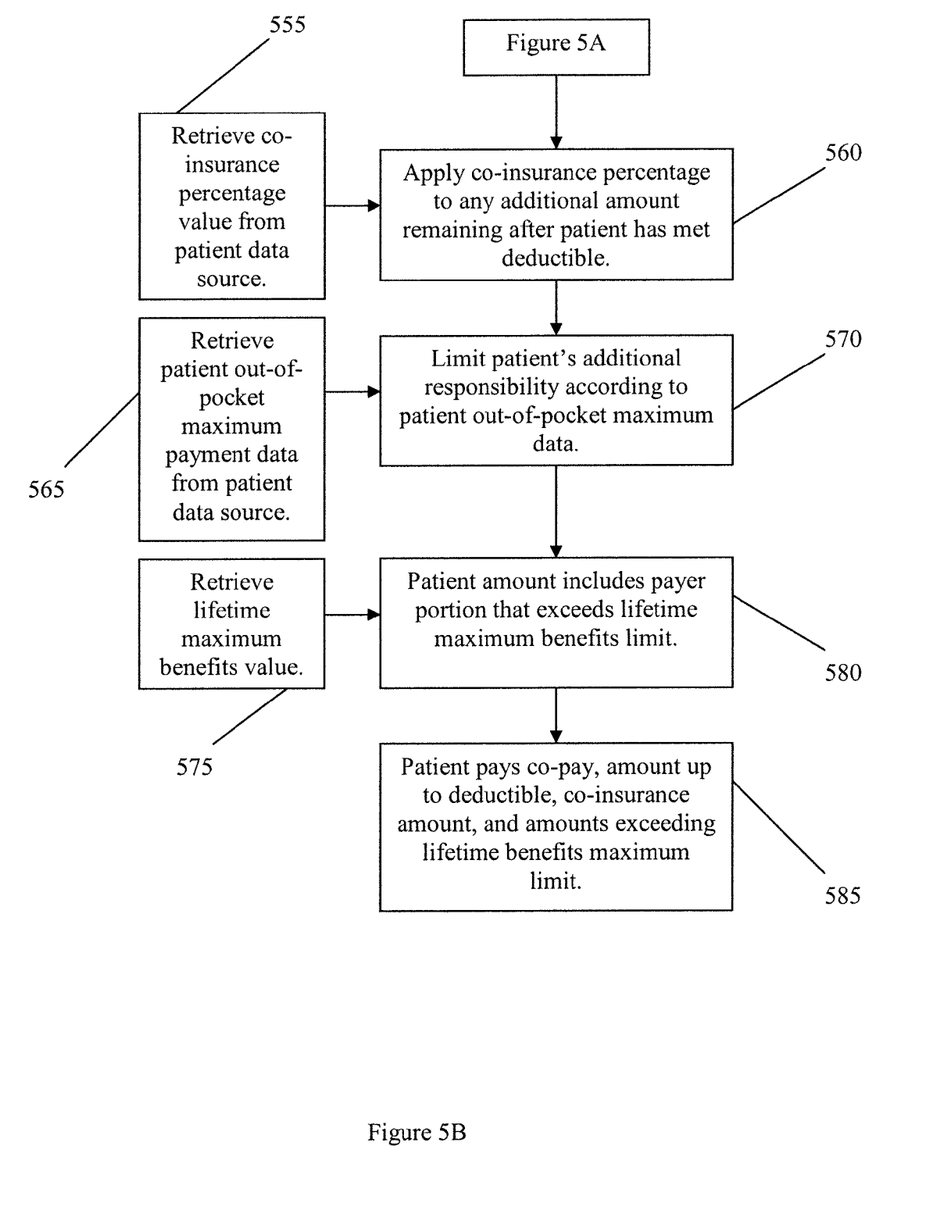

The patient's healthcare benefits parameters and the manner in which those parameters are applied to the estimated payment information provided by estimator module 120 vary according to the particular details of the patient's healthcare coverage plan. FIGS. 5A and 5B show a flowchart illustrating one possible application of a patient's healthcare benefits parameters to the estimated allowed amount for a medical service to determine the portion for which the patient will be responsible (i.e., the patient's financial liability). Calculator module 130 receives the estimated allowed amount from estimator module 120 (step 500) and retrieves the patient's co-pay amount, if any, for the given medical service (step 505). Some healthcare benefits plans call only for a co-pay amount from the patient for certain medical services. If the patient eligibility and benefits data indicates that the patient is not subject to co-insurance payments and deductible limits (i.e., only a co-pay amount is due) (step 510), then calculator module 130 terminates the calculation and returns the co-pay amount as the estimated patient's financial liability (step 515). If the patient eligibility and benefits data indicate that a co-insurance and/or deductible amount may apply in addition to the co-pay amount, the calculator module 130 subtracts the co-pay amount from the allowable amount to determine the remaining amount owed for the medical service (step 520).

Calculator module 130 also retrieves the patient's annual deductible amount and the current remaining deductible to be satisfied from patient eligibility and benefits data source (steps 525 and 530). The system compares these two values to determine the remaining balance of the deductible that the patient must pay before the payer begins paying benefits (step 535). If the remaining deductible amount is higher than the remaining amount owned for the medical service (determined in step 540), the patient will also be responsible for the entire remaining amount (step 545). If the remaining deductible amount is lower than the remaining amount owned for the medical service, the patient's portion will include an amount up to the remaining balance of the deductible to be paid (step 550).

Continuing on FIG. 5B, calculator module 130 retrieves the applicable co-insurance percentage value from the patient eligibility and benefits data source (step 555) and applies the co-insurance percentage against any additional amount that remains after the patient has met the deductible (step 560). Some patients' healthcare benefits plans limit the amount of out-of-pocket expenses the patient incurs during the year. In some plans, these limits apply only to the amount of co-insurance the patient pays and does not include co-pay amounts and deductible amounts. Should such a limit apply, the calculator retrieves the patient's out-of-pocket maximum payment data from the patient data source (step 565) and limits the patient's co-insurance payment amount according to the out-of-pocket maximum payment (step 570). The co-insurance amount, up to the out-of-pocket maximum, is included in the amount to be paid by the patient.

The system then retrieves the patient's lifetime maximum benefits accumulator value (step 575). The calculator then determines what portion, if any, of the amount to be paid by the payer would exceed the patient's lifetime benefits maximum (step 580). In some implementations, this lifetime benefits maximum step is omitted. Thus, under the above scenario, the patient's portion of the payment for the medical service includes the co-pay amount, any amount required to meet the patient's annual deductible, the patient's co-insurance amount, up to the patient's out of pocket limits, and any amounts that would exceed the lifetime benefits maximum value (step 585).

FIG. 6 is an illustrative output screen of patient financial liability estimator system 100. The output screen presents a breakdown of the payments associated with a number of medical services provided to the patient. The screen displays the total patient financial liability estimate in a summary portion 600. In addition, the output screen includes a detailed breakdown of the various procedures included in the medical service provided to the patient. The data presentation also includes cost components for each of the procedure codes in a detailed cost portion 610. The cost components include the total estimated allowed amount, patient co-pay amount, patient co-insurance amount, and the total patient responsibility.

Patient financial liability estimator system 100 provides a detailed, real-time estimate of the patient's portion of the payments associated with medical services provided to the patient. This enables a service provider to collect the proper amount of funds from the patient at the time the service is provided. From the service provider's standpoint, this reduces earnings lost by the service provider due to patient bills that go unpaid. In addition, system 100 reduces administrative complexity and increases efficiency on the part of the service provider's staff by reducing or eliminating the need to submit a later bill to the patient based on an after-the-fact claim adjudication.

System 100 also provides the patient with a more accurate understanding of what his or her portion of the cost of a medical service will be. This enables the patient to make better-informed decisions involving his or her healthcare. For example, if the patient is considering undergoing an elective procedure, an accurate estimate of his or her portion of the payment due is an important fact to consider. Similarly, having a correct understanding of the patient's financial liability for a given medical service enables the service provider and the patient to more easily come to agreement on the terms of payment.

Figure 7:
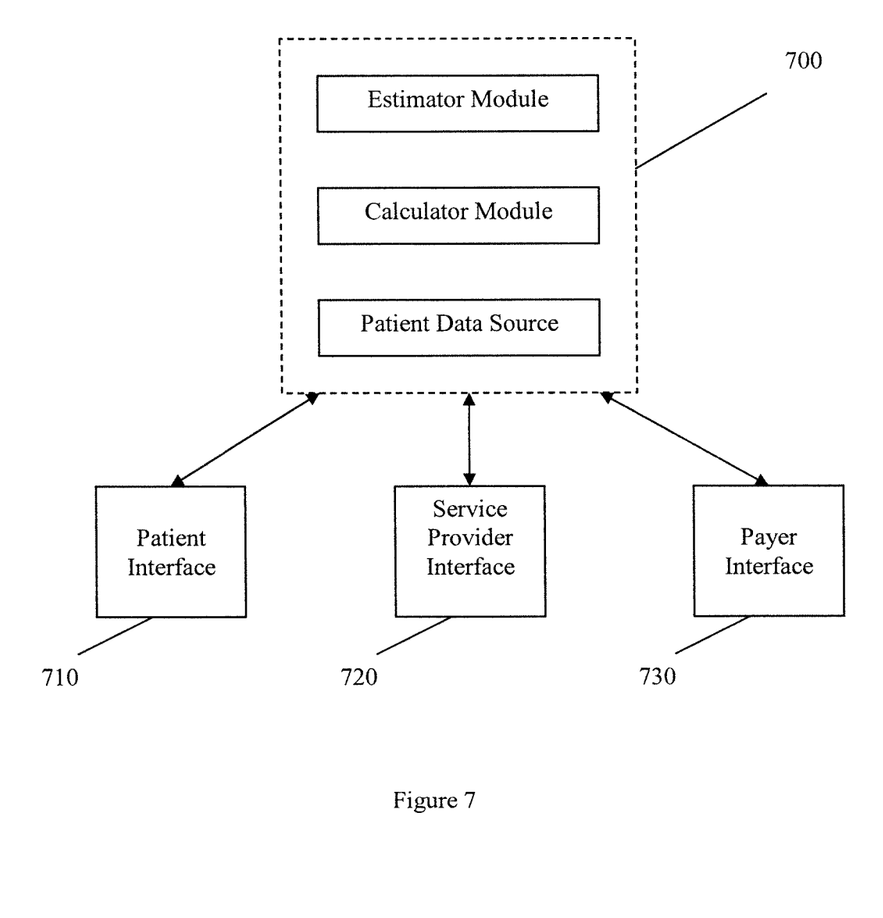
FIG. 7 is an overview of a client/server implementation of a patient financial liability estimator system.

FIG. 7 is an overview of an illustrative client/server implementation of patient financial liability estimator system 100 (of FIG. 1). The server-side of the client/server implementation includes the estimator module, calculator module, and patient data source described above. These components of the system are implemented in a server system 700. The components can reside on a single server or be distributed across multiple servers, which are connected using conventional networking methods. The client-side of the client/server implementation includes a patient interface 710, a service provider interface 720, and/or a payer interface 730. These interfaces enable a user to submit a request to server system 700 for a patient's estimated financial liability for a medical service. The interfaces provide the information described in connection with request generator 110 (of FIG. 1).

Interfaces 710, 720, and 730 communicate with server system 700 using conventional networking methods. For example, the interfaces may transmit data to and receive data from server system 700 via the Internet. The interface can be implemented as an application that runs on a user's personal computer. The interface can also be implemented as a web-based application that presents the user with various screens via Internet browser software.

Embodiments of the present invention build on techniques, systems and methods disclosed in earlier filed applications, including but not limited to U.S. patent application Ser. No. 11/566,286, filed on Dec. 4, 2006, entitled Method and System For Optimizing Fund Contributions to a Health Savings Account, U.S. patent application Ser. No. 11/491,861, filed on Jul. 24, 2006, entitled Method and System For Generating Personalized Health Information With Accommodation for Consumer Health Terminology, U.S. patent application Ser. No. 11/619,012, filed on Jan. 2, 2007, entitled Method and System For Use of a Health Profile with Health-Related Information Tools, U.S. patent application Ser. No. 10/654,503, filed on Sep. 3, 2003, entitled Personalized Health History System with Accommodation For Consumer Health Terminology, U.S. patent application Ser. No. 11/644,577, filed on Dec. 22, 2006, entitled System and Method For Analyzing and Presenting Physician Quality Information, U.S. patent application Ser. No. 11/219,591, filed on Sep. 1, 2005, entitled Personalized Health History System with Accommodation For Consumer Health Terminology, and U.S. patent application Ser. No. 09/945,038, filed on Aug. 31, 2001, entitled Method and System For Consumer Healthcare Decision Making, the contents of which are herein incorporated by reference in their entirety. Those applications taught techniques, methods, and systems for assisting a patient to decide the appropriate amount of money to contribute to his or her Health Savings Account, for helping a patient to determine his or her possible medical conditions, for providing medical information to a patient based on a "plain language" description of medical terms, and for presenting quality, performance, and cost comparison data associated with medical service providers and healthcare benefits plans. The present techniques, however, are not limited to systems and methods disclosed in the incorporated patent applications. Thus, while aspects of the present disclosure may be combined with the techniques incorporated above, the incorporated techniques are not necessary to the present embodiments or inventions.

Application Ser. No. 11/566,286 (herein "HSA Application") describes techniques for assisting a patient to decide an appropriate amount of money to contribute to a Health Saving Account. In general, the HSA Application discloses techniques for estimating the healthcare expenses the patient is likely to incur during a period of time (e.g., a number of years or the patient's lifetime). The methods and systems described above provide information related to the costs of and payments for medical services. Thus, this additional information can supplement and further refine the costs estimates determined by the methods of the HSA Application. For example, by taking into account the patient's healthcare benefits parameters and likely medical service providers, the combined methods arrive at a more accurate estimate of the costs the patient is likely to incur.

Application Ser. Nos. 10/654,503, 11/219,591, and 11/491,861 (herein "Consumer Terminology Applications") describe methods and systems enabling a patient to obtain medical information by interacting with various medical information systems using "plain language" (i.e., terms that would not be used by medical professionals). For example, the Consumer Terminology Applications disclose a health terminology thesaurus that provides the patient with the ability to discover related medical concepts and health or benefits-related information using plain language. The Consumer Terminology Applications also describe techniques that enable the patient to discover possible medical conditions that are related to a list of symptoms, which can be specified in plain language. In addition, the mapping of and the relationships between the terms and concepts described in the Consumer Terminology Applications also enable the system to provide a list of medical services that would commonly be provided to a patient with a given medical condition (as can the techniques disclosed in application Ser. No. 09/945,038). For example, episodic treatment groups can be captured by this information. Thus, the methods and systems described in these applications can be combined with the techniques described above to allow the patient to obtain his or her estimated financial liability for undergoing medical treatment without the patient having to know what specific services might be required to treat a particular condition.

Application Ser. No. 11/619,012 (herein "Health Profile Application") describes a health and personal planning system that includes a suite of health-related information tools and a patient profile. The patient financial liability estimator system is one additional tool that can perform operations based on the patient's information contained in the patient's profile and can provide information to the patient's profile for use by other tools. The patient's profile can serve as the source of healthcare benefit parameters in place of the patient eligibility and benefits data source described herein. In addition, the Health Profile Application describes outputs from various health-related information tools that can be used by the estimator and/or calculator modules. For example, the Health Profile Application discloses several factors that health-related information tools can use to adjust cost estimates made by those tools based on the patient's overall state of health, compliance with healthcare instructions, and risks of contracting certain health conditions. This information can be used to enable the patient financial liability estimator system to modify its payment estimates for a single medical service or for a total estimated payments due for a group of services associated with a particular medical condition.

The interaction between the multiple tools described in the Health Profile Application applies to the patient financial liability estimator system as well. For example, the patient may be experiencing various symptoms and wishes to obtain an estimate of his or her out-of-pocket costs arising from the treatment of the condition causing the symptoms. The patient provides the list of symptoms to the health and personal planning system for storage in the patient's profile. A tool embodying the techniques disclosed in the Consumer Terminology Application operates on the list of symptoms to provide a list of possible medical conditions associated with the symptoms along with a set of medical services that would likely be provided to the patient to cure the condition. In some cases, the medical services provided may vary depending on the patient's overall health, known health condition, and risks of contracting other health conditions. This additional information is supplied by other health-related information tools and provided to the patient's profile, as described in the Health Profile Application, thereby enabling a more accurate determination of the needed medical services. Thus, a refined prediction of the likely medical conditions and the associated medical services to treat the conditions are stored in the patient's profile. The patient financial liability estimator system obtains this information from the profile and presents estimates of the patient's financial liability.

Application Ser. No. 11/644,577 (herein "Physician Quality Application") describes techniques to evaluate physician and/or medical service provider performance. In one implementation, physicians are compared to patient specific benchmarks derived from publicly available data and/or health plan claims data for measuring process performance, outcome, and satisfaction information. The cost to the patient is one metric that is used to evaluate and compare physicians. The methods and systems described in the Physician Quality Application can be enhanced by the techniques described herein. As explained above, the patient's estimated financial liability for a given medical service can vary according to the patient's specific healthcare benefits payer and parameters. Thus, the estimated payment information provided by the patient financial liability estimator enables the comparisons performed by the methods and systems described in the Physician Quality Application to be based on data that is tailored to the specific patient, thereby increasing the accuracy of the comparisons.

As will be realized, other embodiments are within the following claims. Accordingly, the drawings and description are to be regarded as illustrative in nature and not in a restrictive or limiting sense with the scope of the application being indicated in the claims.

What is claimed is:

1. A computer implemented method for estimating financial liability of a patient for a medical service to be provided to the patient by a medical service provider, said method comprising:
   utilizing a computer processor to perform the following steps:
   accessing a first data set including established payments that medical service providers have agreed to be paid by healthcare coverage entities for providing medical services to individuals;
   determining if the first data set includes a specific established payment that a medical service provider of the patient has agreed to be paid by a healthcare coverage entity of the patient for a medical service provided to the patient;
   if the first data set includes the specific established payment, returning the specific established payment for the medical service as an expected payment associated with the medical service;
   if the first data set does not include the specific established payment, accessing a second data set including historical payments made by healthcare coverage entities to medical service providers for medical services provided to a population of individuals;
   determining if the second data set includes a first set of specific historical payments that the medical service provider of the patient has been paid by the healthcare coverage entity of the patient for medical services provided to the population of individuals that are similar to the medical service for the patient;
   if the second data set includes the first set of specific historical payments, estimating the expected payment associated with the medical service for the patient based on the first set of specific historical payments;
   if the second data set does not include the first set of specific historical payments, estimating the expected payment associated with the medical service for the patient based on a second set of specific historical payments that medical service providers sharing a similar classification as the medical service provider of the patient have been paid by the healthcare coverage entity of the patient for medical services provided to the population of individuals that are similar to the medical service for the patient;
   further estimating a cost expected to be borne by the patient for incurring the medical service based on the expected payment and based on a set of parameters associated with a healthcare coverage plan of the patient; and
   presenting financial information that communicates the estimated cost expected to be borne by the patient for incurring the medical service, and an indicator of reliability of that estimated cost.

2. The method of claim 1, wherein the healthcare coverage entity of the patient is at least one of a commercial insurer, a government insurer, a third party administrator, an employer, an employer group, a pharmaceutical benefits manager, and a health maintenance organization.

3. The method of claim 1, wherein the second of data set is based on adjudicated medical claims.

4. The method of claim 1, wherein the set of parameters associated with the healthcare coverage plan of the patient includes at least one of a co-pay amount, a co-insurance value, a deductible threshold, a lifetime benefits maximum payout value, a patient out-of-pocket total maximum amount, and a healthcare payer total benefits payment amount.

5. The method of claim 1, wherein the medical service for the patient includes more than one medical procedure and wherein at least one of the returning the specific established payment or the estimating the expected payment includes determining expected payments associated with the more than one medical procedure and wherein estimating the cost expected to be borne by the patient is based on the expected payments associated with the more than one medical procedure.

6. The method of claim 1 further comprises the computer processor performing the following step:
   determining whether the first data set includes a statistically significant set of data for determining the expected payment associated with the medical service for the patient.

7. The method of claim 6, wherein estimating the expected payment associated with the medical service for the patient based on the historical payments further comprises the computer processor performing the following step:
   if the first data set does not include a statistically significant set of data, determining the expected payment associated with the medical service for the patient from the data in the second data set.

8. The method of claim 1, wherein the indicator of reliability indicates the source of the data used to determine the expected payment.

9. A system for estimating financial liability of a patient for a medical service to be provided to the patient by a medical service provider, said system comprising:
- a computer system;
- program code on a non-transitory computer-readable medium, which when executed on the computer system causes the computer system to:
- access a first data set including established payments that medical service providers have agreed to be paid by healthcare coverage entities for providing medical services to individuals;
- determine if the first data set includes a specific established payment that a medical service provider of the patient has agreed to be paid by a healthcare coverage entity of the patient for a medical service provided to the patient;
- if the first data set includes the specific established payment, return the specific established payment for the medical service as an expected payment associated with the medical service;
- if the first data set does not include the specific established payment, electronically access a second data set including historical payments made by healthcare coverage entities to medical service providers for medical services provided to a population of individuals;
- determine if the second data set includes a first set of specific historical payments that the medical service provider of the patient has been paid by the healthcare coverage entity of the patient for medical services provided to the population of individuals that are similar to the medical service for the patient;
  - if the second data set includes the first set of specific historical payments, estimate the expected payment associated with the medical service for the patient based on the first set of specific historical payments;
  - if the second data set does not include the first set of specific historical payments, estimate the expected payment associated with the medical service for the patient based on a second set of specific historical payments that medical service providers sharing a similar classification as the medical service provider of the patient have been paid by the healthcare coverage entity of the patient for medical services provided to the population of individuals that are similar to the medical service for the patient;
- further estimate a cost expected to be borne by the patient for incurring the medical service based on the estimated expected payment and based on a set of parameters associated with a healthcare coverage plan of the patient; and
- present financial information that communicates the estimated cost expected to be borne by the patient for incurring the medical service, and an indicator of reliability of that estimated cost.

10. The system of claim 9, further comprising an output device, wherein the computer system presents financial information through the output device.

11. The system of claim 9, wherein the population of individuals and the patient have a same healthcare coverage entity at the time each was provided the medical service.

12. The system of claim 11, wherein the healthcare coverage entity is at least one of a commercial insurer, a government insurer, a third party administrator, an employer, an employer group, a pharmaceutical benefits manager, and a health maintenance organization.

13. The system of claim 9, wherein the similarity of the classification is based on at least one of a geographic location of the medical service providers, a specialty of the medical service providers, and a type of facility of the medical service providers.

14. The system of claim 9, wherein the second data set is based on adjudicated medical claims.

15. The system of claim 14, wherein the adjudicated medical claims are for payments for medical services incurred by individuals having a same healthcare coverage entity as the patient.

16. The system of claim 15, wherein the adjudicated medical claims are for payments for medical services provided to the individuals by the same medical service provider providing the medical service to the patient.

17. The system of claim 9, wherein the set of parameters associated with the healthcare coverage plan of the patient includes at least one of a co-pay amount, a co-insurance value, a deductible threshold, a lifetime benefits maximum payout value, a patient out-of-pocket total maximum amount, and a healthcare payer total benefits payment amount.

18. The system of claim 9, wherein the medical service includes more than one medical procedure and wherein the computer system estimates the expected payment based on expected payments associated with the more than one medical procedure and wherein the computer system estimates the cost expected to be borne by the patient based on the expected payments associated with the more than one medical procedure.

19. The system of claim 9, wherein the indicator of reliability indicates the source of the data used to determine the expected payment.

* * * * *